Figure 1:
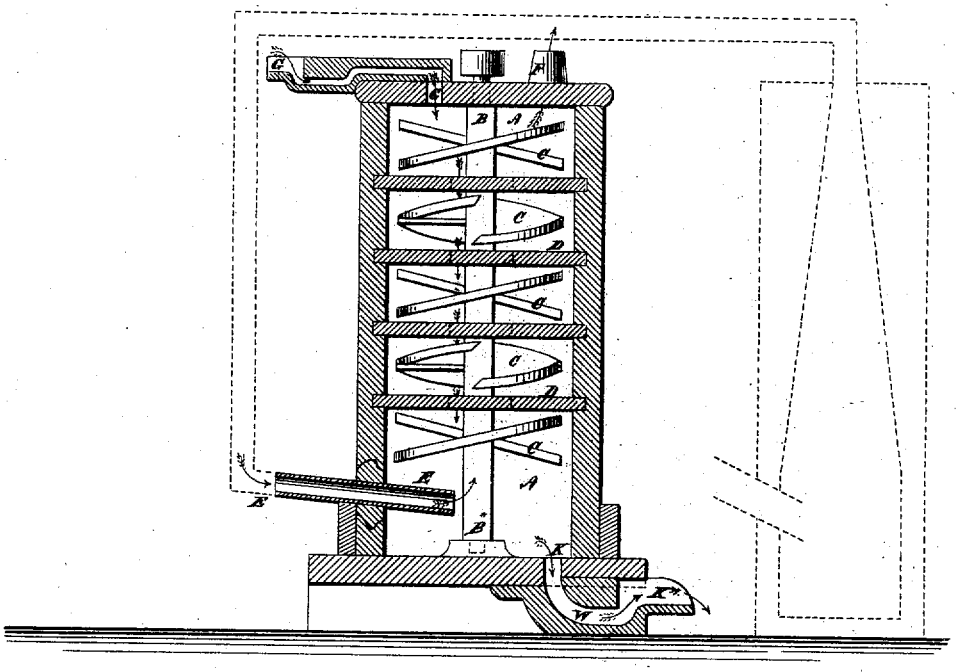
Figure 2:
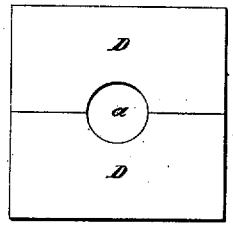

J. M. LESCALE.

Apparatus for Bleaching Cane-Juice.

No. 9,045. Reissued Jan. 13, 1880.

Witnesses:
S. F. Sullivan
Geo. H. Miatt

Inventor:
John M. Lescale,
By his Attorney
E. N. Dickerson Jr.

N. PETERS, PHOTO-LITHOGRAPHER, WASHINGTON, D. C.

UNITED STATES PATENT OFFICE.

JOHN M. LESCALE, OF PAINCOURTVILLE, LOUISIANA.

APPARATUS FOR BLEACHING CANE-JUICE.

SPECIFICATION forming part of Reissued Letters Patent No. 9,045, dated January 13, 1880.

Original No. 161,527, dated March 30, 1875. Application for Reissue filed August 21, 1879.

*To all whom it may concern:*

Be it known that I, JOHN M. LESCALE, of Paincourtville, in the parish of Assumption and State of Louisiana, have invented certain new and useful Improvements in Apparatus for Bleaching Cane-Juice; and I do hereby declare the following to be a full, clear, and exact description of the invention, such as will enable others skilled in the art to which it pertains to make and use it, reference being had to the accompanying drawings, which form part of this specification.

My invention relates to an improvement in bleaching cane-juice; and it consists in the bleaching apparatus for subjecting cane-juice in an air-tight chamber to the action of sulphurous-acid gas, as will be more fully described hereinafter.

My invention also relates to apparatus generally for bringing into intimate contact a descending stream of liquid and an ascending flow of gas; and it consists, generally, of a series of revolving distributers, upon which the liquid falls and by which it is scattered or broken up within the chamber where the purification is proceeding, the said chamber being provided with an opening at the top for the introduction of the liquid, and one at or near the bottom for the admission of the gas.

It also consists in combining with the revolving distributers located in a chamber or vessel provided with openings at top and bottom, as aforesaid, a certain number of stationary distributers placed between revolving distributers, so that the descending liquid is distributed by the revolving distributers and falls upon the fixed distributers or receivers alternately.

In apparatus heretofore devised for the bleaching of cane-juice revolving drums separated by a stationary partition have been arranged in a tank, so that the cane-juice and sulphurous acid are mingled together by the action of said drums and partition. In such apparatus, however, the liquid and gas are introduced together through an opening in the top.

In this invention, as already stated, the gas to be brought in contact with the liquid enters at the bottom, passes upward and out at the top, so that it is brought into intimate contact with the descending liquid. The apparatus is useful wherever it is desired to bring a liquid and a gas into intimate association.

The accompanying drawing represents my invention.

A represents an air-tight chamber of suitable dimensions, in the center of which, journaled at top and bottom, is the shaft B, provided with sets of wings C, each one of which extends spirally around the shaft in the spaces between the shelves D. The juice is poured upon the upper set of wings through the pipe G, and is by them dispersed in every direction, and falls upon and is collected by the shelves D beneath, from which it will run or drip down through holes *a* in the shelves D and fall upon the next set underneath, to again be dispersed by centrifugal force, and to be collected again, and so on successively until it reaches the bottom, where it is drawn off by pipe K. The pipes G and K are provided with sealing-chambers, so as not to admit the outside air while filled with cane-juice.

The sulphurous-acid gas is introduced into the lower part of the chamber A through a pipe, E, and carried upward by the motion of the wings, so that the spray to which the juice is reduced comes in the most intimate contact with this bleaching agent, which is allowed afterward to escape at the top through pipe F, and is constantly replenished from below.

I generate sulphurous-acid gas by burning sulphur in a furnace, and as it is introduced in large quantities at the bottom of the chamber the cane-juice is last exposed to the freshest supply before it is drawn off through pipe K, and thereby perfectly bleached should any coloring-matter have remained.

I am aware of the fact that it is not new to bleach cane-juice by means of sulphurous acid in a tank in which revolving drums reduce the liquid to a spray by centrifugal action. I therefore disclaim the use of sulphurous acid as constituting my invention, and also the broad idea of a centrifugal dispersing apparatus.

Notwithstanding the fact, however, that water dissolves fifty times its volume of sulphurous acid, the consistency of the juice is such that it requires to be brought in the most intimate association with the gas to perfectly bleach the same, and it is to accomplish this end that my apparatus is constructed. Sulphurous acid, moreover, being about two and one-half times heavier than air, it is a sluggish, heavy gas, and in being generated it moves so slowly and heavily to the bleaching apparatus that the latter cannot be well supplied with a sufficient quantity of the gas in proportion to the amount of juice used unless some artificial means are made to assist the natural passage of the gas. To meet this difficulty the wings are placed upon the shaft in a spiral manner, so that when the shaft is revolved at the rate of three hundred revolutions a minute a strong draft is created, which brings the gas from the generator and carries it upward in the tank through the falling spray in the manner which produces the best possible results. This arrangement is only necessary when a heavy gas is to be operated upon.

In cases when a generation of too much acidity is to be apprehended, as when the cane has been greatly injured by frost or any other cause, a small quantity of lime-water is introduced into the juice before it enters the apparatus for bleaching, and by this means the development of acidity is arrested.

Having thus described my invention, I claim—

1. The bleaching apparatus consisting of the outer casing, A, shelves D, having central openings, *a*, the revolving shaft B, and the spirally-arranged wings C, attached to the shaft and alternating with the shelves, all combined and arranged substantially as and for the purpose described.

2. In a machine for mingling a liquid and a gas which has a chamber or vessel provided at the bottom with an opening, through which opening a stream of gas passes upward, and provided also with a pipe opening thereinto at the top, from which pipe a stream of liquid passes downward, a series of revolving distributers revolved by the same central shaft, for the purpose of breaking the fall of the liquid and causing it to descend in a shower, substantially as described.

3. In a machine for mingling a liquid and a gas provided with an opening at the upper part for delivering a stream of liquid into the machine, and provided at the bottom with an opening for admitting a flow of gas, a central shaft provided with a series of revolving distributers, in combination with a series of stationary distributers or shelves, for the purpose of receiving the falling liquid, distributing it in a shower, receiving it on the shelves below, and again distributing it, whereby a complete mingling of the liquid and the gas is obtained, substantially as described.

4. In a machine for mingling a liquid and a gas, in combination with a vessel or chamber provided at the top with an opening for delivering the liquid thereinto and at the bottom with an opening for admitting the gas, a series of revolving distributers revolved by the same central vertical shaft, which are located in intervals on the axis of the machine, for the purpose of receiving and distributing the falling current of liquid and of breaking the rising currents of gas, substantially as described.

5. In a machine for mingling a liquid and a gas in which a stream of gas passes upward and a stream of liquid passes downward, a series of revolving liquid-distributers located on the same central axis, and entrance and delivery pipes for the liquid, each provided with a trap or seal for the purpose of preventing the escape of the gas, substantially as described.

J. M. LESCALE.

Witnesses:
A. FRANKLIN PUGH,
N. LE BLANC.